US011235627B2

(12) United States Patent
Fagot-Revurat et al.

(10) Patent No.: US 11,235,627 B2
(45) Date of Patent: Feb. 1, 2022

(54) PARAMETER MEASUREMENT SYSTEM FOR A MOUNTED ASSEMBLY

(71) Applicants: COMPAGNIE GENERALE DES ETABLISSEMENTS MICHELIN, Clermont-Ferrand (FR); SAFRAN, Paris (FR); SAFRAN LANDING SYSTEMS, Velizy-Villacoublay (FR); SAFRAN ELECTRONICS & DEFFENSE, Boulogne-Billancourt (FR)

(72) Inventors: Lionel Fagot-Revurat, Clermont-Ferrand (FR); Julien Destraves, Clermont-Ferrand (FR)

(73) Assignees: COMPAGNIE GENERALE DES ETABLISSEMENTS MICHELIN, Clermont-Ferrand (FR); SAFRAN, Paris (FR); SAFRAN LANDING SYSTEMS, Velizy-Villacoubl (FR); SAFRAN ELECTRONICS & DEFFENSE, Boulogne-Billancour (FR)

( * ) Notice: Subject to any disclaimer, the term of this patent is extended or adjusted under 35 U.S.C. 154(b) by 0 days.

(21) Appl. No.: 16/759,553

(22) PCT Filed: Oct. 16, 2018

(86) PCT No.: PCT/EP2018/079460
§ 371 (c)(1),
(2) Date: Apr. 27, 2020

(87) PCT Pub. No.: WO2019/081738
PCT Pub. Date: May 2, 2019

(65) Prior Publication Data
US 2021/0178837 A1  Jun. 17, 2021

(30) Foreign Application Priority Data
Oct. 27, 2017  (FR) ...................... 1760160

(51) Int. Cl.
B60C 23/04 (2006.01)
B60C 23/20 (2006.01)

(52) U.S. Cl.
CPC .......... *B60C 23/0452* (2013.01); *B60C 23/20* (2013.01)

(58) Field of Classification Search
CPC ........................... B60C 23/0452; B60C 23/02
(Continued)

(56) References Cited

U.S. PATENT DOCUMENTS 5,663,496 A * 9/1997 Handfield ........... B60C 23/0401
73/146.5
7,009,576 B2  3/2006 Adamson et al.
(Continued)

FOREIGN PATENT DOCUMENTS

EP   1 580 041 A1   9/2005
FR   2 817 509 A1   6/2002

OTHER PUBLICATIONS

International Search Report dated Dec. 10, 2018, in corresponding PCT/EP2018/079460 (4 pages).

*Primary Examiner* — Eric Blount
(74) *Attorney, Agent, or Firm* — Venable LLP

(57) ABSTRACT

A system for measuring parameters of a mounted assembly comprises an electronic device for measuring parameters of the mounted assembly and a bonding interface made of elastomeric material surrounding the electronic device. The measuring electronic device comprises: a UHF radiofrequency antenna; and an electronic board with an electronic chip coupled to the UHF radiofrequency antenna, a sensor for measuring parameters of the mounted assembly, a microcontroller and an electrical circuit. The measuring system comprises a ground plane connected to the electronic board. The electronic board comprises an energy manager and a capacitive element. The coupling between the electronic
(Continued)

chip and the UHF radiofrequency antenna is of an electrical nature. The electronic chip, the microcontroller and the measuring sensor are components of low energy consumption.

13 Claims, 4 Drawing Sheets

(58) Field of Classification Search
USPC .......................................................... 340/447
See application file for complete search history.

(56) References Cited

U.S. PATENT DOCUMENTS

| | | |
|---|---|---|
| 7,021,132 B2 | 4/2006 | Nigon et al. |
| 7,089,099 B2 * | 8/2006 | Shostak ................ B60C 23/005 |
| | | 701/29.6 |
| 7,408,453 B2 * | 8/2008 | Breed ................... B60C 23/041 |
| | | 340/442 |
| 7,603,894 B2 * | 10/2009 | Breed ............... B60R 21/01538 |
| | | 73/146 |
| 2002/0190853 A1 | 12/2002 | Nigon et al. |
| 2003/0132893 A1 | 7/2003 | Forster et al. |
| 2004/0252072 A1 | 12/2004 | Adamson et al. |
| 2006/0244581 A1 * | 11/2006 | Breed ................. B60C 23/0408 |
| | | 340/447 |
| 2006/0290587 A1 | 12/2006 | Forster et al. |
| 2006/0290588 A1 | 12/2006 | Forster et al. |
| 2007/0035387 A1 * | 2/2007 | Forster ............... B60C 23/0442 |
| | | 340/447 |
| 2007/0057861 A1 | 3/2007 | Forster et al. |

* cited by examiner

PARAMETER MEASUREMENT SYSTEM FOR A MOUNTED ASSEMBLY

FIELD OF THE INVENTION

The present invention relates to an electronic system for monitoring parameters of a mounted assembly comprising an aeroplane tyre casing equipped with such a system allowing an interrogation on demand and at distance, without physical operations on the mounted assembly.

TECHNOLOGICAL BACKGROUND

Over the last few years, for safety reasons, wheel modules built around a technology called TPMS (acronym of Tyre Pressure Monitoring System) have been developed, allowing a communication to be set up with the mounted assembly in order to avoid the risk of accident in case, for example, of a loss of inflation pressure from the mounted assembly. These devices are active electronic devices comprising, on the one hand, sensors that measure parameters of the wheel, such as for example the inflation pressure or the temperature of the pressurized fluid contained between the tyre casing and the rim, and on the other hand, radiofrequency communication means with a dedicated energy source for dialoguing with the vehicle or a control unit. These wheel modules also generally comprise an electronic chip and a memory space in order to manage, post process or store quantities of the wheel component.

These wheel modules, which are incorporated into one of the components of the wheel, such as for example the rim or the tyre casing, are seeing their functionalities regularly increased. The latest developments, which are generally built around the TMS technology (TMS being the acronym of Tyre Mounted Sensor), propose to move all or some of this wheel module to the crown block of the tyre casing.

Furthermore, in the field of aviation, the high thermomechanical stresses undergone by mounted assemblies during the phases of take-off and landing and regulatory constraints related to this activity make it complex to exploit electronic systems and in particular movable elements such as are found in batteries. On the one hand, these mechanicals stresses, such as those generated by the shocks of impact on entry or exit from the area of high-speed contact, engender a premature and uncontrolled deterioration of these movable components. On the other hand, it is necessary to ensure that the integration of these electronic systems is not detrimental to the endurance of the mounted assembly and most particularly to the tyre casing. Thus, it is necessary to optimize the integration of this electronic system into the mounted assembly.

In addition, the violent thermal stresses related to braking make the temperature nonuniform within the mounted assembly. Thus, the measurement of the temperature of the fluid cavity of the mounted assembly is greatly influenced by the location of the sensor with respect to these heat sources. For example, the measurement of temperature using a TPMS system mounted on the rim valve is greatly disrupted by heating of the wheel during the braking phase.

Lastly, the inflation pressure of the mounted assemblies used in aviation is very high. Thus, carrying out manual maintenance operations on the mounted assembly is tricky because of the risk that the tyre casing will burst if poorly handled.

The technical problem to be solved consists in defining a radiocommunication electronic system incorporated into the mounted assembly that is compatible with the thermomechanical stresses placed on the mounted assembly and the regulatory constraints of aviation while allowing a communication at any moment and at distance from the electronic system.

SUMMARY OF THE INVENTION

The invention relates to a system for measuring parameters of a mounted assembly. The mounted assembly consists of a tyre casing and a wheel. The measuring system comprises an electronic device for measuring parameters of the mounted assembly and a bonding interface made of elastomeric material partially surrounding the measuring electronic device and serving as interface between the tyre casing and the measuring electronic device. The measuring electronic device comprises:
  a UHF radiofrequency antenna;
  an electronic board comprising:
    an electronic chip coupled to the UHF radiofrequency antenna;
    at least one sensor for measuring parameters of the mounted assembly;
    a microcontroller;
    an electrical circuit connecting together the electronic chip, the microcontroller and the sensor for measuring parameters of the mounted assembly.
The measuring system is characterized in that it comprises a ground plane connected to the electronic board, in that the electronic board comprises a capacitive element and an energy manager, in that the coupling between the electronic chip and the UHF radiofrequency antenna is of electrical nature and in that the electronic chip, the microcontroller and the at least one sensor for measuring parameters of the mounted assembly are components of low energy consumption.

The measuring system allows communication via a UHF (acronym of Ultrahigh Frequency) radiofrequency transmitting/receiving device located at distance from the mounted assembly. Specifically, the radiofrequency antenna is here a far-field radiating antenna that permits a communication at distance between the UHF radiofrequency device and the measuring system while minimizing constraints on the relative position of the two objects. Thus, the measuring system is easier to use. The UHF band is the best possible compromise between a small size of the UHF radiofrequency antenna and a suitable radiofrequency read distance. In addition, the small size of the radiofrequency antenna facilitates its integration into the mounted assembly and in particular into the tyre casing without notable detriment to the endurance of the various structures. Lastly, the small size of the radiofrequency antenna allows the additional weight due to this antenna to be limited. In addition, the insertion of the radiofrequency antenna into a bonding interface made of an elastomeric mixture ensures a change in the propagation speed of the radiofrequency waves with respect to free space leading to a decrease in the useful length of the radiofrequency antenna. Furthermore, this interface facilitates integration of this measuring system into a tyre casing, in particular after this tyre casing has been cured. Specifically, the elastomer/elastomer adhesion facilitates the bonding of this interface to the tyre with or without adhesion promoter even when the tyre is in its cured state. Lastly, the small size of the UHF radiofrequency antenna allows the volume occupied by the bonding interface to the restricted, this also facilitating its incorporation into the tyre. This radiofrequency device comprises, on the one hand, a radiofrequency transmitter intended for the measuring system and a radiofrequency receiver intended to listen thereto. These two functions may be performed by one and the same communication instrument. This UHF radiofrequency device transmits and receives radiofrequency waves in the UHF frequency band comprised between 300 MHz and 3 GHz, and most particularly the frequency bands of about 430 MHz and comprised between 860 and 960 MHz that are received or sent by the UHF radiofrequency antenna of the electronic measuring device.

The captured radiofrequency energy is then transmitted as electrical energy to the electronic chip. The use of electrical coupling between the radiofrequency antenna and the electronic chip optimizes the efficiency of the transfer of power between these components, contrary to electromagnetic coupling solutions such as inductive solutions the efficiencies of which are lower.

The electronic chip, the microcontroller and the sensor for measuring parameters of the mounted assembly are in this case components of low energy consumption. The expression "low consumption" is here understood to mean that their activation energy is low. Furthermore, their standby mode minimizes leakage currents and their service life is short. In addition, the electronic chip optimizes the transfer of energy to the electronic board via an energy manager. The latter controls the charge and discharge of a capacitive element that stores a certain amount of energy without having the structural drawbacks of a battery. However, the amount of energy stored is necessarily lower than in a battery. The energy manager transfers energy to the electronic board when a certain threshold level of storage in the capacitive element is reached. This transfer of energy wakes the components of the electronic board still on standby and then launches the measuring sequence. Furthermore, the measuring sensor optimizes its energy consumption via the microcontroller. This system for storing energy is necessary because the measuring system is passive and because the measuring sensor and the components of the measuring system need energy to perform their function. Due to the interrogation at distance, in the far-field, of the measuring system, some of the energy transmitted by the UHF radiofrequency device is dissipated because, inter alia, of the separation between the communication antennas of the two objects and because of the random relative positioning of the main directions of the two antennas. These conditions, separation and random relative positioning of the antennas, are constraints set to facilitate the use of the measuring system. With the aim also of minimizing the energy consumption of the measuring system, especially when the latter is not in use, the electronic components of the measuring system are of the category low energy consumption.

Lastly, the transmitted communication of the electronic chip is of passive type, without energy source. The transmitted signal is reflected and modulated using the received signal via a variation in the impedance of the electronic chip.

When required, an analogue/digital converter is employed between the microcontroller and the measuring sensor to convert between digital information and analogue information, which is intended for or comes from the analogue measuring sensor. The collected digital information is then transmitted to the memory space of the electronic chip before being converted by the same electronic chip into a specific electrical signal that is distributed to the UHF radiofrequency antenna. The latter converts the electrical signal into a radiofrequency signal that is transmitted to the radiofrequency receiving device.

The measuring system comprises a ground plane connected to the electronic board, allowing all of the components of the electronic board to be connected to the same reference voltage. This allows parasitic interference with the electronic board considered as a whole to be minimized, thus limiting the background noise in the measurements of the acquiring device. In addition, this ground plane allows the measuring system to better meet the regulatory constraints of aviation in respect of electromagnetic interference.

According to one particular embodiment, the UHF radiofrequency antenna is a half-wave dipole monoband antenna the total length L of which is comprised between the following limits:

$$0.9*C/(2*f) < L < 1.1*C/(2*f),$$

in which, C is the speed of the radiofrequency waves in the medium in which the UHF radiofrequency antenna (20) is embedded and f is the communication frequency of the UHF radiofrequency antenna (20).

Among UHF radiofrequency antennas, the half-wave dipole antenna is an inexpensive antenna of elementary design composed mainly of at least two coaxial strands aligned with the axis of the antenna, one of their ends being joined together and the strands separating. In addition, the integration of this antenna of elementary design into the tyre casing is easier than the integration of multiband or directional antennas. The total length L of the antenna corresponds to the half-wavelength of the radiofrequency antenna. When the antenna is monoband, the frequency of use of the antenna is set to a central frequency with a narrow bandwidth. This allows the energy to be focused into a narrow frequency spectrum maximizing energy transfer between the UHF radiofrequency device and the radiofrequency antenna, both on transmission and on reception. If the power radiated to or from the radiofrequency antenna is limited, this type of design is suitable for transferring the maximum radiated energy. Lastly, a half-wave dipole antenna allows radiation into a large space around the antenna both on transmission and on reception, i.e. it is a so-called omnidirectional antenna. Thus, it is well suited to use in a mounted assembly because of the random angular position of the radiofrequency antenna with respect to the Earth's coordinate system and the random position of the UHF radiofrequency device with respect to the mounting assembly.

It will be noted that the radiofrequency waves move at speeds that depend on the, in particular dielectric, nature of the medium in which the communication antenna is located. Thus, since the radiofrequency antenna of the measuring system is surrounded by an interface made of an elastomeric mixture, an average dielectric-permittivity value of 5 is taken into account to determine the speed C of the radiofrequency waves.

According to one very particular embodiment, the half-wave dipole antenna consists of at least two strands, the length of the path L0 travelled along each strand being comprised between the following limits:

$$0.5*C/(4*f) < L0 < 2.0*C/(4*f),$$

in which C is the speed of the radiofrequency waves in the medium in which the strand is embedded and f is the communication frequency of the UHF radiofrequency antenna.

Although a half-wave dipole antenna functions at a central frequency governed by the half wavelength, the integration into a tyre casing of a half-wave dipole antenna causes disruption to the radiofrequency operation of the antenna. In fact, the wavelength of the antenna is dependent both on the central frequency but also on the speed coefficient of the waves in the medium in which the antenna is embedded. However, the elastomeric mixtures from which the bonding interface but also the tyre casing are made also have a notable influence on this speed coefficient in particular because they modify the relative permittivity of the medium in which the radiofrequency antenna is found. Of course, depending on the chemical composition of the elastomeric mixtures or of the fabrics formed from these elastomeric mixtures, and in particular on the amount of carbon, the relative dielectric permittivity with respect to free space of the medium changes. Because of the nonuniformity of the mixtures employed in the bonding interface and within the tyre casing, of their geometry and of the variety of possible locations for the measuring system in the tyre casing, the range of values of the length of the path travelled in each strand of the antenna is wide, in order to adapt to any situation. In this case, an average relative permittivity for the elastomeric mixtures is set as reference; a value of about 5 is then defined.

Advantageously, a strand of the half-wave dipole antenna is comprised in the group comprising linear, meander, curved, helicoidal.

These are various design modes of the strand of the half-wave dipole antenna. The most conventional is the linear strand, which has the smallest spatial bulk because of its one-dimensional character. It allows the transfer of energy between the radiofrequency energy exchanged with the radiofrequency device and the electrical energy transmitted to the radiofrequency antenna to be optimized. Specifically, the efficiency is optimal if the entirety of the length of the strand is perfectly aligned with the electric field generated by the radiofrequency waves. However, such a strand is fragile with respect to mechanical stresses transverse to the direction of the stand. Lastly, such a strand is bulky in its main dimension with respect to the dimensions of the tyre casing, facilitating merely averagely its integration into this object, above all if the latter is of small size.

Meander and curved solutions make the strand compact in terms of length to the detriment of an elongation in the second direction of the plane of the antenna. Specifically, these are two-dimensional strands the dimension of which in the direction normal to the plane of the strand is small with respect to the other dimensions of the plane of the strand. These shapes naturally facilitate the integration of the strand into the tyre casing. Thus, the mechanical endurance of the tyre casing and of the radiofrequency antenna are improved thereby. However, this improvement is to the detriment of energy efficiency because of the nonalignment of the entirety of the strand with the direction of the electric field generated by the radiofrequency waves.

Lastly, a helicoidal strand is a three-dimensional structural element that is well suited to absorbing the thermomechanical deformations undergone by the tyre casing irrespectively of the direction of the stress, thus ensuring a good mechanical endurance of the radiofrequency antenna and facilitating positioning of the antenna in the tyre casing. In addition, the compactness of the strand obtained via the third dimension facilitates the integration of the radiofrequency antenna into the tyre casing, in particular for tyre casings of small size. However, this compactness is to the detriment of the efficiency of the energy transfer. Lastly, this type of antenna is complex as regards its production and its integration into an electronic board, which is by nature two-dimensional.

In summary, depending on the dimensions of the tyre casing (which will make integration of the strand easier or less easy), on the energy consumption of the measuring device and on the choice of the site of the measuring device in the tyre casing, it is recommendable to prefer one strand design over another. However, it is entirely possible to combine in the same strand various shapes, and for the half-wave dipole antenna to comprise various strands of different strand shapes.

According to one specific embodiment, the dipole antenna comprises at least one folded strand forming a loop the half-perimeter D of the strand of which, defined by the direction of the UHF radiofrequency antenna, defining the travelled path L0, is comprised between the following limits:

$$0.5*C/(4*f) < D < 2.0*C/(4*f)$$

where C is the speed of the radiofrequency waves in the medium in which the strand is embedded and f is the communication frequency of the UHF radiofrequency antenna.

This is another embodiment of a strand of the half-wave dipole antenna. It is a two-dimensional structural element since the dimension of the loop in the direction normal to the loop is small with respect to the other main dimensions of the loop. The half-perimeter is defined using geometric points of the loop that are located at the intersection of the direction of the UHF radiofrequency antenna with the loop. Due to the nonuniformity of the elastomeric mixtures of the bonding interface and of a tyre casing, to the position of the measuring device with respect to the bonding interface and to the various possible positions of insertion of the measuring system in the tyre casing, it is recommendable to precisely adjust the length D case-by-case to optimize the exchange of energy between the power radiated by the radiofrequency device and the radiofrequency antenna. However, a defined value in the proposed interface makes it possible to ensure an amount of energy sufficient to make the measuring system work.

According to one very specific embodiment, the loop of the strand has a shape comprised in the group comprising circle, ellipse, oval, rectangle, rhombus, square and polygon.

Whatever the shape of the loop, it allows a closed loop defining a perimeter to be produced. Thus, it is possible to adapt the shape of the loop to the geometric constraints of the electronic device. In particular, the proximity of the radiating antenna to the electronic board may have an influence on the space available to define the loop of the strand of the radiating antenna. In order to form the most compact possible electronic device, so as to optimize the mechanical endurance of the electronic device and the tyre casing that must receive it, the designer will select a particular strand architecture while taking into account the cost and constraints of manufacture of such a strand.

According to another very particular embodiment, the loop of half-perimeter D is integrated into the ground plane of the electrical circuit.

This is one very particular embodiment in which the size of the ground plane allows it to be used as a strand of the dipole antenna. This structure of the strand improves the mechanical resistance of the strand of the antenna and in addition minimizes the manufacturing cost of the dipole antenna.

Advantageously, an oriented path L1 of the strand representing at least 50% of the travelled path L0 of the at least one strand is oriented in the direction of the UHF radiofrequency antenna.

If the length of the travelled path L0 allows the resonant frequency of the radiating antenna to be centred on the central frequency of the radiofrequency device in communication therewith, it is also possible to improve the energy efficiency of the transfer between these two structures by aligning the axis of the radiating antenna with the electric field of the radiofrequency device. Of course, efficiency is maximum if the electric field of the radiofrequency device is constant and if the radiating antenna is perfectly aligned. However, if 50% of the length of the strand is aligned, the efficiency is sufficient for the electronic device to work. This is a compromise between the efficiency of the transfer of energy from the radiofrequency device to the electronic device and the mechanical endurance of the radiating antenna inserted into a tyre casing.

Very advantageously, an optimal oriented path L2 representing at least 70%, preferably 80%, of the oriented path L1 of the strand is continuous. In addition, the optimal oriented path L2 is located in the portion of the strand comprising the strand end fastened to the electronic chip.

These distinctive features have similar and additional effects on the energy transfer between the radiating antenna and the radiofrequency device. Specifically, these features increase the interaction between the electric field of the radiofrequency device and the magnitude of the electric current flowing through the radiating antenna, this current communicating directly with the electrical circuit of the electronic device.

According to one specific embodiment, one portion of the electronic board, of the ground plane and of the UHF radiofrequency antenna are coated in a mass of parylene.

The elements of the measuring system are fragile as a result of their very structure or their connections. The measuring system is intended to be inserted into an aeroplane tyre casing that is subjected to high thermomechanical stresses. Therefore, the insertion into a parylene mass, which by nature is rigid, of these elements increases the mechanical endurance of these elements in a highly stressful environment.

In addition, certain components of the electronic board, such as the measuring sensors, may need to make contact with the fluid that is exteriorly bounded by the measuring system. However, by nature this fluid is not perfect. The fluid may contain a variable amount of moisture but also dirt or impurities that may influence the response of the measuring sensor. Likewise, the radiating antenna and the ground plane of the measuring system may make direct contact with this fluid and undergo the same types of physico-chemical aggressions. For these reasons, the hermetic protection provided by the parylene is effective.

According to one preferred embodiment, the UHF radiofrequency antenna is connected to an impedance matching circuit located between the UHF radiofrequency antenna and the electronic chip.

The impedance matching circuit improves the transfer of energy between the UHF radiofrequency antenna and the electronic chip by minimizing energy losses between these two components. This allows the electrical energy transmitted to the electronic chip and therefore to the electronic board to be really increased. This matching is particularly necessary in the case where the radiating antenna is unbalanced, as is the case when the two strands of the half-wave dipole are of different designs. It allows the radiating antenna to be balanced and matches the impedance of the radiating antenna to the electronic chip. This matching is achieved using circuits that ideally are purely capacitive or inductive and which may be combined together as required by the matching According to one particular embodiment, the bonding interface is equipped with a through-orifice bringing the fluid located outside the measuring system and at least one active region of the at least one sensor for measuring parameters of the mounted assembly into communication Specifically, if the measuring sensor of the mounted assembly measures chemico-physical properties of the pressurized fluid cavity formed by the mounted assembly, such as inflation pressure, it is necessary for these sensors to be in connection with this fluid cavity. The bonding interface being intermediate between the tyre casing and the electronic device, the orifice allows the active portion of the measuring sensor to be brought into communication with the fluid cavity.

According to another particular embodiment, the sensor for measuring parameters of the mounted assembly is comprised in the group comprising pressure sensor, temperature sensor, vertical position sensor, angular position sensor, accelerometer.

Among the sensors for measuring parameters of the mounted assembly, the most commonly employed are pressure and temperature sensors since they directly measure physical quantities that are directly linked to the use and correct operation of the mounted assembly or of the tyre casing. Temperature sensors measure either the temperature of the fluid of the internal cavity of the mounted assembly or the temperature over certain specific regions of the tyre casing. However, other measuring sensors such as accelerometers and position sensors may also be employed in order to assist with diagnosis of the correct usage of the mounted assembly or of the tyre casing or of the state of the mounted assembly at the time a measurement is taken by another sensor.

The invention also relates to a tyre casing equipped with such a system for measuring parameters of a mounted assembly in which the tyre casing is intended for aerial use.

The tyre casing has a design adapted to the thermomechanical stresses of aerial use. Said casing comprises a system for measuring parameters of a mounted assembly. The measuring system is joined to the tyre casing via the bonding interface made of elastomeric material. In certain embodiments, the measuring system is located within the same tyre casing if the sensor for measuring parameters of the mounted assembly does not need to communicate directly with the fluid cavity of the mounted assembly. In other embodiments, it is fastened to the interior surface of the tyre casing if the measuring device comprises specific sensors such as a pressure sensor or temperature sensors characterizing the fluid of this cavity.

BRIEF DESCRIPTION OF THE DRAWINGS

The invention will be better understood on reading the following description, which is given merely by way of example, with reference to the appended figures, in which identical portions have been designated throughout with the same reference numbers, and in which.

DETAILED DESCRIPTION OF EMBODIMENTS

Figure 1:
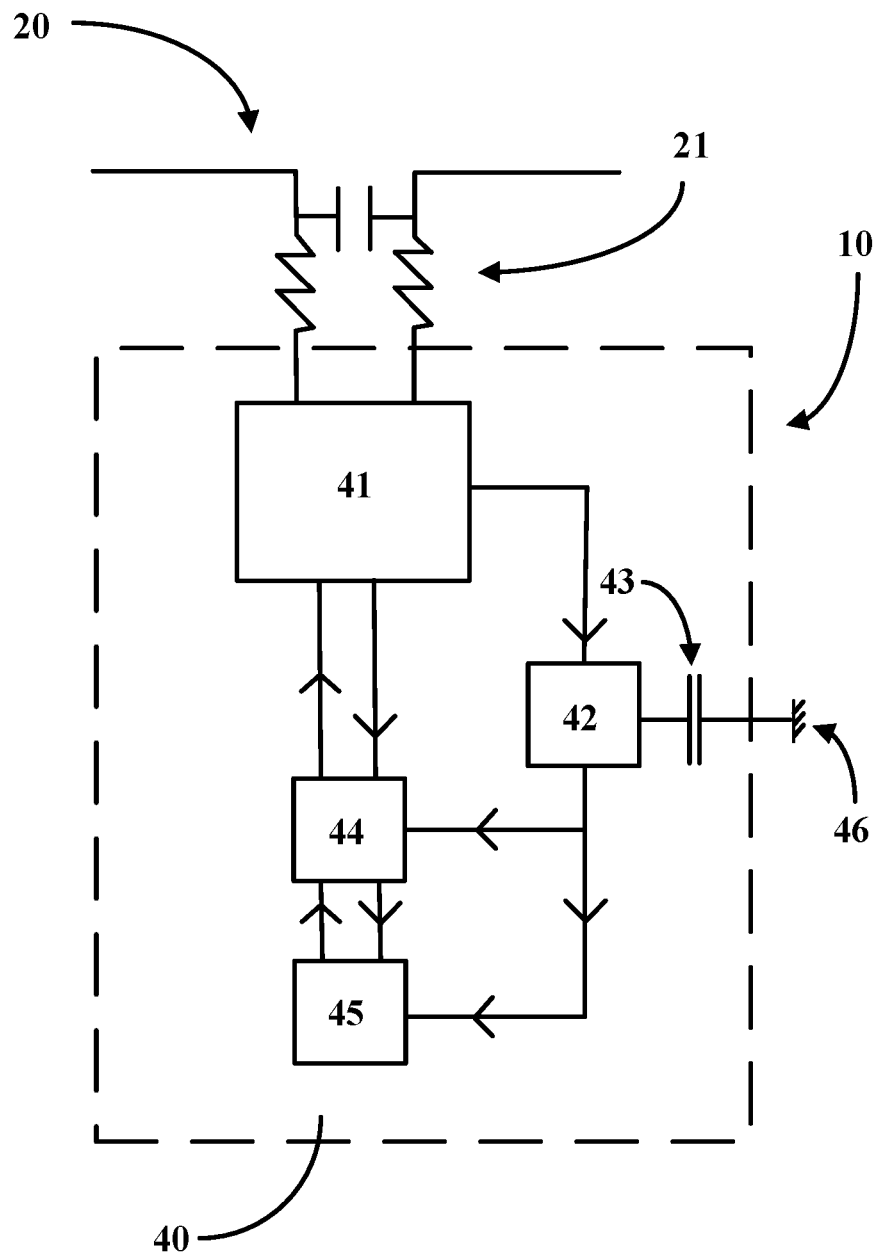
FIG. 1 shows a diagram of the electronic device according to the invention.

FIG. 1 shows a diagram of the electronic device 10 of the system for measuring parameters of the mounted assembly.

The radiocommunication portion comprises a UHF radiating antenna 20 that is connected to the electronic board 40 via the electronic chip 41. Where required, an impedance matching circuit 21 is inserted between these two components in order to couple them effectively and optimize the transfer of electrical energy.

The electronic board 40 comprises a first subassembly ensuring energy management. This subassembly comprises an energy manager 42 that serves as interface between the electronic chip 41 and the capacitive element 43. Specifically, the electrical energy delivered to the electronic chip 41 is directed to the energy manager 42, which orients the energy flow toward the capacitive element 43. This capacitive element 43 is the energy reservoir of the electronic board 40. When the capacitive element 43 has reached a certain threshold allowing the electronic board 40 to be made to work, the energy of the capacitive element 43 is transferred to the electronic board 40 via the energy manager 42.

The electronic board 40 also comprises a second subassembly ensuring the measurement and post-processing of this measurement firstly comprising, starting from the electronic chip 41, a microcontroller 44. This microcontroller 44 ensures the communication of information between the electronic chip 41 and the sensor 45 for measuring parameters of the mounted assembly. At the very least, communication is from the microcontroller 44 to the electronic chip 41. Often, the communication is two-way. Specifically, either the electronic chip 41 sends an instruction from a list of instructions to the microcontroller 44, or the electronic chip 41 sends information received from the microcontroller 44 (the latter verifies that the transmitted information is compliant). The microcontroller 44 is also in communication with the measuring sensor 45.

Communication is at the very least from the measuring sensor 45 to the microcontroller 44. Often it is two-way in order to acknowledge transmitted information or transmit an operation to the measuring sensor from a list of possible operations to be performed such as, for example, carry out a measurement or communicate some or all of the content of the memory of the measuring sensor 45 or any other task to be carried out by the measuring sensor 45.

Apart from these first two subassemblies, which are connected together via the electrical circuit 47, the electronic board 40 is connected to a ground plane 46. Of course, the electrical circuit 47 galvanically connects all of the elements of the electronic board 40. It will be noted that when the measuring sensor 45 is an analogue sensor, a digital/analogue converter is incorporated between the microcontroller 44 and the measuring sensor 45 in order to decode or encode information between the digital mode specific to the electronic chip 41 and the analogue mode of the measuring sensor 45. Lastly, the energy manager 42 transmits the energy required for the electronic board 40 to operate correctly at least to the microcontroller 44, which then redistributes it to the measuring sensor. However, the energy manager may as indicated in the diagram also directly supply the measuring sensor 45 and where required the digital/analogue converter.

Figure 2:
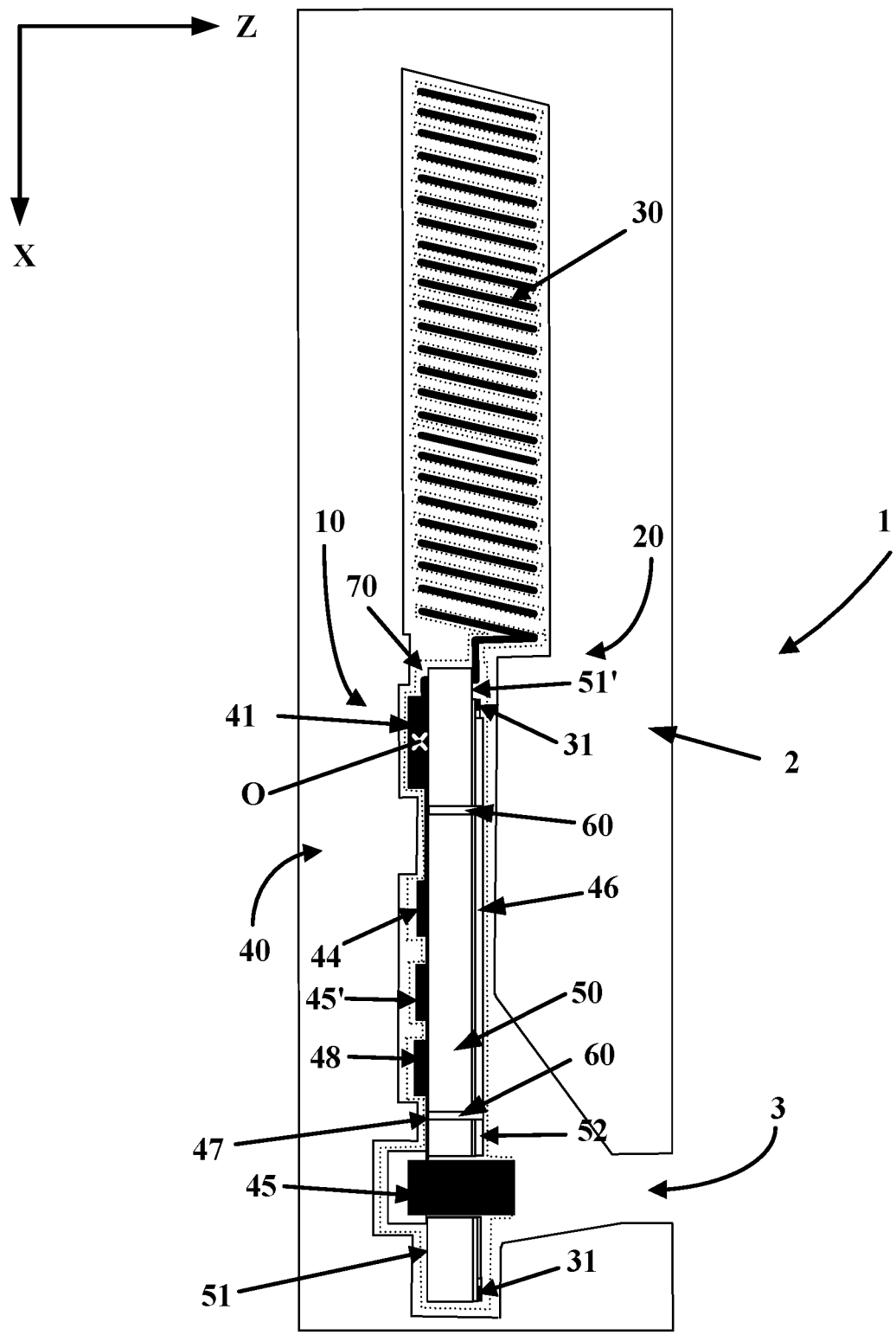
FIG. 2 is a cross-sectional view of the measuring system according to the invention.

FIG. 2 is a cross section of the system 1 for measuring parameters of the mounted assembly cut in the plane OXZ. The direction X is the direction of the UHF radiating antenna 20, which here is a half-wave dipole. The direction Z is the direction vertical to the electronic board 40. Lastly, the point O is the centre of the electronic chip 41. The latter conventionally has the shape of a parallelepiped the vertical direction Z of which corresponds to its smallest dimension.

This measuring system 1 comprises a bonding interface 2 surrounding the radiating antenna 20, the ground plane 46 and the electronic board 40. This bonding interface 2 is a mass of elastomeric mixture. Thus, any elastomer/elastomer adhesion solution may be used to fasten the measuring system 1 to the tyre casing. The bonding interface 2 comprises a through-orifice 3 bringing the fluid located outside the bonding interface 2 into communication with the measuring sensor 45, which is a pressure and temperature sensor the measurement of which focuses on the properties of this fluid.

In this configuration, the measuring system 1 also comprises a first helicoidal metal strand 30 connected to the electronic board 40. This helicoidal strand 30 is mechanically anchored via a through-orifice that passes vertically through the printed circuit board 50 and a solder joint that joins this metal strand 30 to a pad made of a metal such as copper, which pad is comprised in the electrical circuit 47 of the electronic board 40. The first element of the electronic board 40 connected via the electrical circuit 47 to this pad is the electronic chip 41. The latter is also connected via the electronic circuit 47 to a second strand 31 of the radiating antenna.

This strand 31 is here a circular metal loop, it is therefore an areal structure the plane of which contains the axis of rotation of the helicoidal first strand 30 and the main direction of the loop of which is parallel to the axis of rotation of the first strand 30. Thus, the two strands 30 and 31 indeed form a dipole radiating antenna. The length of the path travelled along each strand is adapted to a central communication frequency of about 433 MHz when the measuring system is incorporated into a tyre casing on one of the sidewalls thereof.

The electronic board 40 is constructed from a printed circuit board 50 one of the metal, here copper, faces 51 of which has been chemically etched in order to form the electrical circuit 47, which is made up of conductive wires connecting connection pads to which the various elements of the electronic device 10 are connected. These pads may be apertured or unapertured depending on the system for anchoring the element to the printed circuit board 50. In the case of the helicoidal strand 30 and of the loop 31, the pads are apertured. In the case of the energy manager or of the capacitive element or of the microcontroller 44, they are unapertured, these elements being fastened to the printed circuit board 50 by adhesive bonding. The other face 51' of the printed circuit board 50 is covered with a bilayer film the upper layer 52 of which is made of metal, in order to form the ground plane 46. Here, the ground plane 46 is disassociated from the loop 31 forming the second strand of the radiating antenna, although the two elements were initially joined in the upper layer 52 of the film. A chemical etch of the metal layer 52 of the bilayer film allowed them to be physically and electrically disassociated via the insulating lower layer of the film.

The connection between the ground plane 46 and the electronic board is achieved by connecting elements 60 that connect the upper surface 52 to the lower surface 51 of the printed circuit board. The connection to the lower surface 51 is to the electrical circuit 47.

The first face 51 of the printed circuit board 50 accommodates the various elements of the electronic board 40. Said elements are mechanically fastened to the printed circuit board 50 and electrically connected to the electrical circuit 47. Here, only the subassembly ensuring the measurement is shown in FIG. 2. In first place, directly connected to the electronic chip 41, is located the microcontroller 44. Next, a measuring sensor 45 of pressure-sensor type is connected to the microcontroller 44 and an analogue/digital converter 48 is located between these two components. A second measuring sensor 45' of digital-accelerometer type is directly connected galvanically to the microcontroller 44.

It will be noted that the pressure sensor 45 is positioned on either side of the printed circuit board 50. Specifically, it is electrically connected to the electrical printed circuit board 47 on the first face 51 of the printed circuit board 50. However, the active portion of the pressure sensor 45 is located above the top layer 52 of the bilayer film in the direction Z. The pressure sensor 45 is anchored subsequently to the connection of the other electronic components.

A protective layer 70 is then required to protect these elements from physicochemical aggressions of the exterior environment of the measuring system 1. This protection 70 is based on parylene deposited by condensation on the assembly consisting of the complete electronic board 40, of the ground plane 46 and of the radiofrequency antenna 20. This deposition process makes it possible to ensure a small but constant thickness of protector over all the external surface. Thus, maximum protection is achieved with a minimum mass of protector. Beforehand, the active region of the pressure sensor 45 will have been protected in order to not be covered by this protection 70. The parylene provides both mechanical protection but also hermeticity to solid and liquid contaminants. Lastly, this protector 70 is compatible with the elastomeric mixtures that make up the bonding interface 2. Of course other protectors such as epoxy resin could have sufficed, but use thereof would be less of an advantage than use of parylene.

Figure 3:
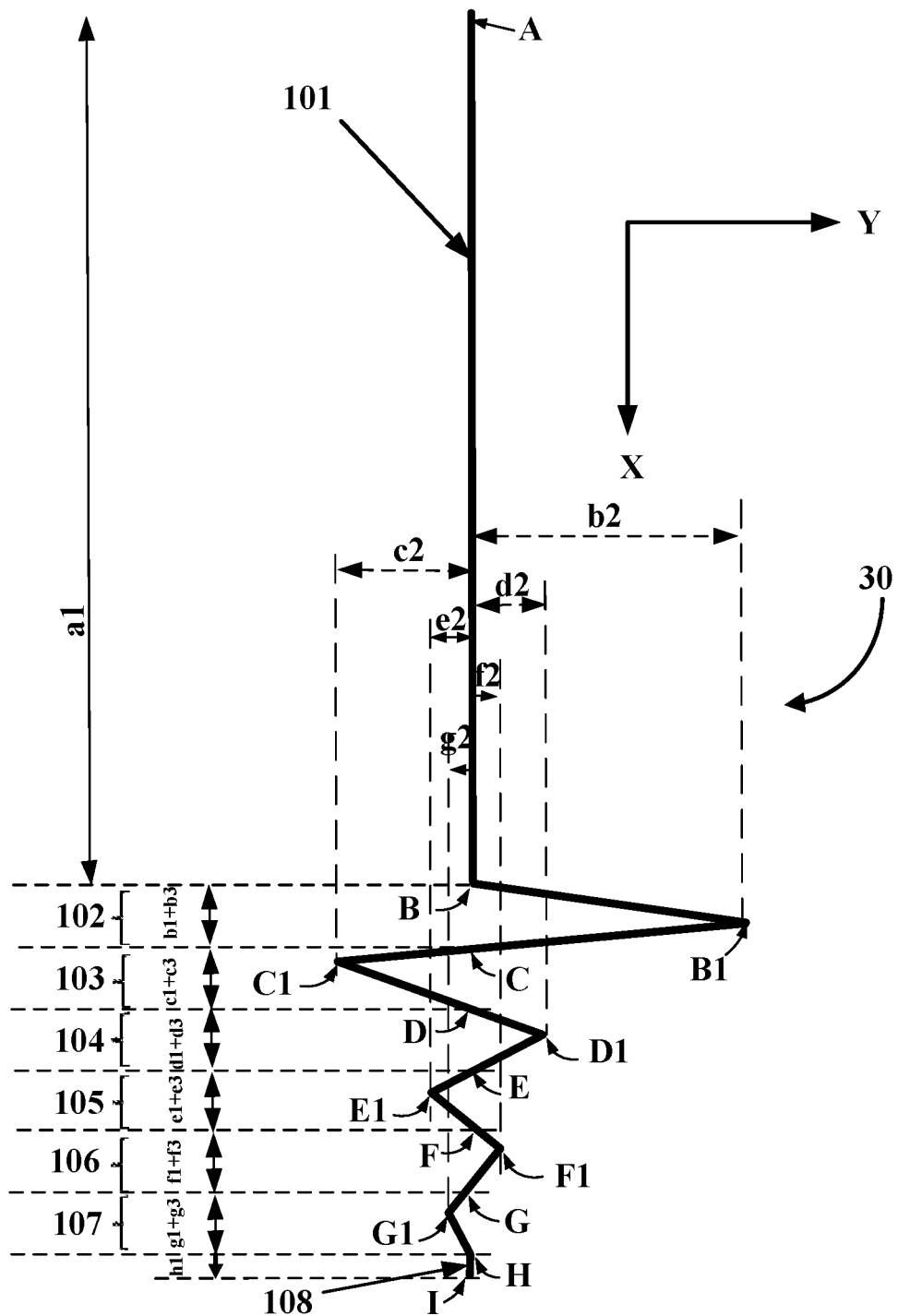
FIG. 3 is a view from above of a strand of the dipole radiating antenna.

FIG. 3 is an example of a strand 30 of a UHF radiating antenna in a configuration that is optimal in terms of energy efficiency. Said antenna is a two-dimensional structure perfectly integrating the system for measuring parameters of the mounted assembly. The two ends A and I of the strand define the axis X representing the axis of the radiating antenna. The axis Y is the direction perpendicular to the axis X in the plane of the strand 30. The point A here corresponds to the feed point of the strand 30 of a UHF radiofrequency antenna of the device.

Said antenna comprises a metal wire firstly having a rectilinear section 101 between the points A and B of a length representing 50% of the total length of the strand. The point A is the end of the strand 30 that will be galvanically connected to the electronic chip. The second portion of the strand 30, between the points B and H, has a right-meander type structure that ends with a rectilinear section between the points H and I representing 0.5% of the total length of the strand 30. In fact, the section between the points B and H is a succession of meanders 102, 103, 104, 105, 106 and 107 the dimension of which in the direction X is constant and of a value equivalent to 1.5% of the length of the strand 30. However, the dimension in the direction Y continuously decreases. For example, the meander 103 is bounded by the points C and D. For each meander, the path travelled along the meander may be decomposed into a component in the direction X and a component in the direction Y. The X-component of each meander is, because of the construction of this strand, constant and has a value equivalent to 3% of the length of the strand 30. However, the Y-component of each meander, from the end B to the end H, continuously decreases by a factor of 2 with a maximum dimension, in the meander 102, equivalent to 8% of the length of the strand 30. For the meander 104, this X-component is the sum of the elementary distances d1 and d3. As regards the Y-component of the same meander 104, it is two times the elementary distance d2. The formulae of the X and Y components will be similar from one meander to the next.

Thus, the path L0 travelled along this strand 30 is then the complete distance of the strand 30. This travelled path L0 is then obtained by the following formula:

$$L0 = a_1 + \sum_{i=b}^{g}(i_1 + 2*i_2 + i_3) + h_1$$

The value of L0 is about 80 millimetres, which is indeed comprised in the interval desired for a half-wave dipole radiating antenna operating at the frequency of 900 MHz. The oriented path L1 of this strand corresponds to the distance travelled in the single direction X that is the axis of the radiating antenna. This path L1 is then simply defined by the following formula:

$$L1 = a_1 + \sum_{i=b}^{g}(i_1 + i_3) + h_1 = 0.685*L0$$

The value of L1 represents about 70 percent of the total path L0 travelled along the strand 30. Thus, the vocation of most of the strand 30 will be to accelerate the electrical charge located on the strand 30 by virtue of the electric field of the radiofrequency device.

Lastly, the optimal oriented path L2 of this strand 30, which corresponds to the greatest continuous segment of the strand 30 perfectly aligned with the direction X corresponding to the axis of the radiating antenna, is then defined by the following formula:

$$L2 = a_1 = 0.5*L0$$

The optimal oriented path L2 is indeed at most 70 percent of the oriented path L1 of the strand 30 of the antenna. In addition, this optimal oriented path L2 comprises the end A of the strand that will be placed plumb with the electrical connection to the electronic chip.

Figure 4:
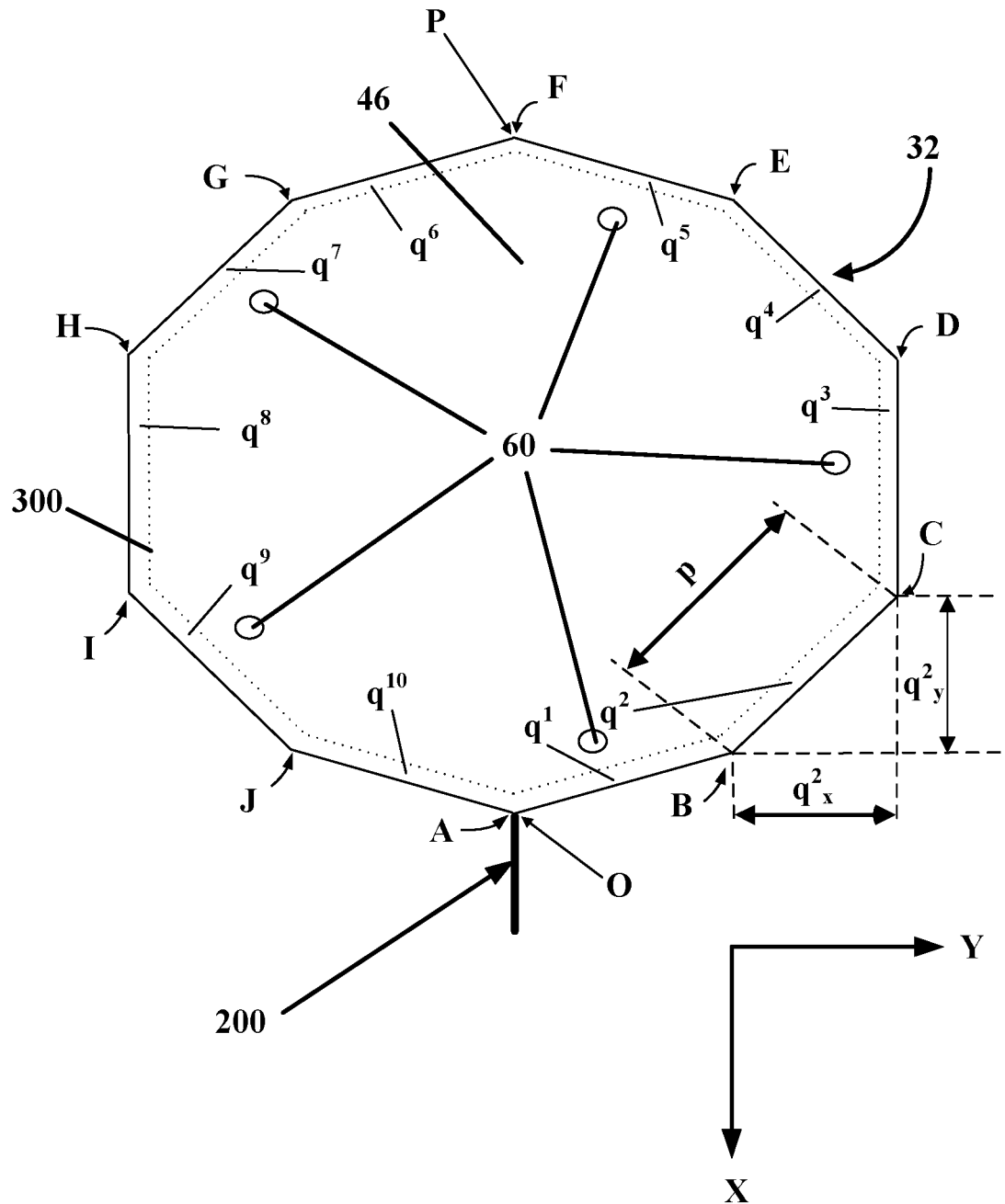
FIG. 4 is a view from above of a loop forming the strand of a dipole antenna according to the invention.

FIG. 4 is a view from above of a strand 32 of the UHF radiating antenna, which strand is integrated into the ground plane 46 of the electronic device. The ground plane 46 is here delineated by a regular hexagon defining a total area of about 500 square millimetres. The ground plane 46 has on its face five connecting elements 60 between the ground plane 46 and the electronic board, allowing the electrical connection thereof to be ensured. A rectilinear section 200 of small size that will be neglected in the evaluation of the paths of the strand is located at one end of the hexagon. An alignment of this rectilinear section 200 with the axis of the UHF radiofrequency antenna is desirable, to produce a half-wave dipole antenna a first strand of which will be the loop 32 integrated into the ground plane 46. This alignment represents the axis. The end left free of this rectilinear section 200 represents a feed point of the UHF radiofrequency antenna. The direction Y is orthogonal to the directions X and Z where Z is the direction normal to the ground plane 46 directed away from the electronic board.

Each end of the hexagon is defined by a letter A to J in the direct direction of travel of the hexagon in the plane XY. Each segment $q^i$ of the hexagon has a length p that, depending on the orientation of the segment of length p in the plane XY, defines a component $q^i_x$ in the direction X and a component $q^i_y$ in the direction Y.

The loop strand 32 may then be imagined to be located on the periphery of the ground plane 46. Specifically, this region corresponds to the area in which the electric charge located on the ground plane 46 moves when the latter is placed in an electric field E parallel to the ground plane 46. The dotted line 300 shows the imagined thickness of this loop 32, in order to allow it to be seen in FIG. 4.

Starting from the rectilinear section 200, the intersection of the loop 32 with the axis X defines a first point O and a second point P. The distance defined by the regular hexagon between these two points is constant irrespective of the direction of travel of the regular hexagon. This travelled distance corresponds both to the half-perimeter D of the loop 32 but also to the travelled path L0 of the loop 32. This distance is defined, limiting consideration to segments $q^1$ to $q^5$ of the regular hexagon, by the following formula:

$$L0 = \sum_{i=1}^{5} q^i = 5p$$

It is then easy to determine the oriented path L1 of the loop 32, by focusing on the projections of the segments of the regular hexagon in the direction X. Thus, the oriented path L1 is obtained using the following formula:

$$L1 = \sum_{i=1}^{5} q_x^i = 3.72 * p = 0.74 * L0$$

This strand 32 of loop type allows an oriented path that is right for obtaining a sufficient energy efficiency to be obtained. However, it is not optimal because of the orientation of the loop strand 32. However, the particular shape of this antenna ensures the compactness of the measuring system, at the very least achieved by giving the ground plane 46 a primary role as the electrical regulator of the electronic board and a secondary role as a radiofrequency strand.

The invention claimed is:

1. A system for measuring parameters of a mounted assembly,
  the mounted assembly consisting of a tire casing and of at least one wheel,
  the system comprising an electronic device for measuring parameters of the mounted assembly and a bonding interface made of an elastomeric material surrounding at least partially the electronic device and serving as an interface between the tire casing and the electronic device, and
  the electronic device comprising:
    a UHF radiofrequency antenna; and
    an electronic board comprising:
      an electronic chip coupled to the UHF radiofrequency antenna;
      at least one sensor for measuring parameters of the mounted assembly;
      a microcontroller; and
      an electrical circuit connecting the electronic chip, the microcontroller, and the at least one sensor for measuring parameters of the mounted assembly,
  wherein the system comprises a ground plane connected to the electronic board, the electronic board comprises a capacitive element and an energy manager, the coupling between the electronic chip and the UHF radiofrequency antenna is an electrical coupling, and the electronic chip, the microcontroller and the at least one sensor for measuring parameters of the mounted assembly are low energy consumption components, and
  wherein the UHF radiofrequency antenna is a half-wave dipole monoband antenna, a total length L of which satisfies the following limits:

$0.9*C/(2*f)<L<1.1*C/(2*f)$, in which C is the speed of radiofrequency waves in a medium in which the UHF radiofrequency antenna is embedded and f is a communication frequency of the UHF radiofrequency antenna.

2. The system according to claim 1, wherein the half-wave dipole antenna consists of at least two strands, the length of a path L0 travelled along each strand satisfying the following limits:

$0.5*C/(4*f)<L0<2.0*C/(4*f)$, in which C is the speed of the radiofrequency waves in the medium in which a strand is embedded and f is the communication frequency of the UHF radiofrequency antenna.

3. The system according to claim 2, wherein a shape of at least one strand of the half-wave dipole antenna is selected from the group consisting of linear, meander, curved, and helicoidal.

4. The system according to claim 1, wherein the dipole antenna comprises at least one folded strand forming a loop, a half-perimeter D of which, defined by a direction of the dipole antenna, defining a travelled path L0, satisfies the following limits:

$0.5*C/(4*f)<D<2.0*C/(4*f)$ where C is a speed of the radiofrequency waves in a medium in which a strand is embedded and f is a communication frequency of the UHF radiofrequency antenna.

5. The system according to claim 4, wherein the loop has a shape selected from the group consisting of circle, ellipse, oval, rectangle, rhombus, square and polygon.

6. The system according to claim 4, wherein the loop is integrated into the ground plane.

7. The system according to claim 3, wherein an oriented path L1 of a strand representing at least 50% of the travelled path L0 of the strand is oriented in a direction of the UHF radiofrequency antenna.

8. The system according to claim 7, wherein an optimal oriented path L2 representing at least 70% of the oriented path L1 of the strand is continuous.

9. The system according to claim 8, wherein the optimal oriented path L2 is located in a first portion of the strand comprising a strand end fastened to the electronic chip.

10. The system according to claim 1, wherein at least one portion of the electronic board, of the ground plane, and of the UHF radiofrequency antenna are coated in a mass of parylene.

11. The system according to claim 1, wherein the UHF radiofrequency antenna is connected to an impedance matching circuit located between the UHF radiofrequency antenna and the electronic chip.

12. The system according to claim 1, wherein the bonding interface is equipped with at least one through-orifice bringing fluid located outside the system and at least one active region of the at least one sensor for measuring parameters of the mounted assembly into communication.

13. The system according to claim 1, wherein the at least one sensor for measuring parameters of the mounted assembly is selected from the group consisting of a pressure sensor, a temperature sensor, a vertical position sensor, an angular position sensor, and an accelerometer.

* * * * *